June 9, 1964 C. LUCANERA ET AL 3,136,997
VARIABLE GLIDE SLOPE SYSTEM
Filed May 22, 1959 3 Sheets-Sheet 1

INVENTORS.
CONSTANTINO LUCANERA
ERNEST J. ANNECHIARICO
BY Philip M. Bolton
ATTORNEY INVENTORS.
CONSTANTINO LUCANERA
ERNEST J. ANNECHIARICO
BY Philip M. Bolton
ATTORNEY

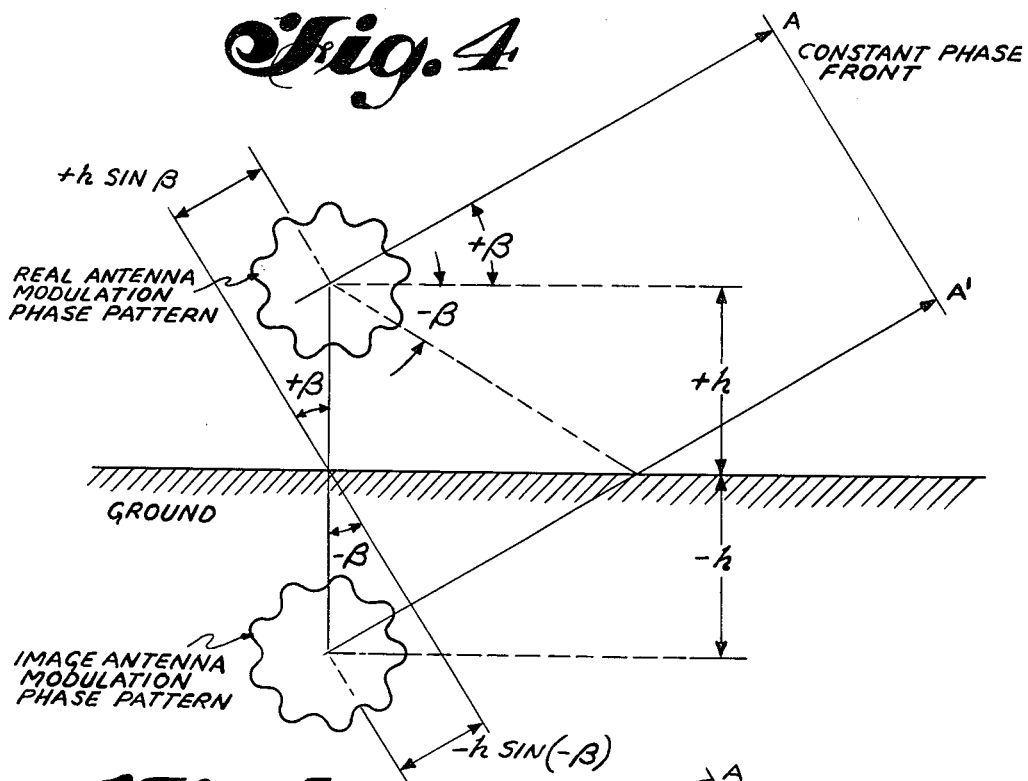
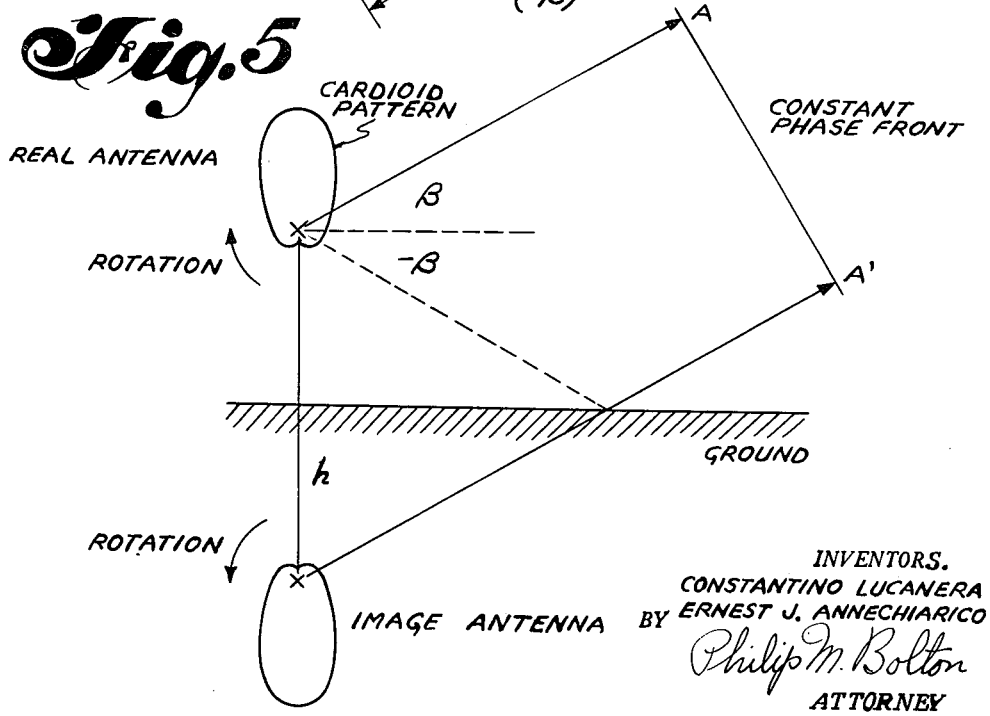

United States Patent Office 3,136,997
Patented June 9, 1964

3,136,997
VARIABLE GLIDE SLOPE SYSTEM
Constantino Lucanera, Blauvelt, N.Y., and Ernest J. Annechiarico, Ramsey, N.J., assignors to International Telephone and Telegraph Corporation, Nutley, N.J., a corporation of Maryland
Filed May 22, 1959, Ser. No. 815,182
2 Claims. (Cl. 343—108)

This invention relates to glide slope systems and more particularly to such systems in which an antenna radiates a modulated carrier signal, the phase of said modulation being a function of glide slope angle.

In the past, various arrays of antenna elements energized by carrier signal and sidebands resulting from carrier modulations at one or more modulating frequencies have been employed to create radiation representing a glide path in space. In some prior systems such a glide path is represented by points in space where the amplitudes of radiated signals of opposite phase are equal and, therefore, cancel producing a null. One limitation of such prior systems is that only one glide path in space, defined by said null is produced. Consequently, all aircraft employing such a beacon must approach along a single glide path. Such a limitation imposes many difficulties particularly where craft having appreciably different landing speeds must approach and land along such a spatial path. Another limitation of prior systems is that ground reflectivity and the height of the array above the reflection level of the ground must be maintained constant. If these factors are not maintained constant, the spatial path will be distorted or otherwise altered. Ground reflectivity and reflection level are often altered from day to day by precipitation: rain, snow, or ice.

An object of the present invention is to provide an improved glide slope system in which the above-mentioned limitations of prior systems are avoided.

Another object is to provide a glide slope beacon by which an aircraft may obtain guidance along any chosen one of an infinite number of glide slopes.

Another object is to provide a simple antenna device for producing a radiation pattern with information content unaffected by ground reflectivity or reflection level and by which an aircraft may be guided to a landing along any chosen glide slope.

Another object is to provide a modulated pattern of radiation from a ground location, said modulations being unaffected by ground reflectivity and reflection level and bearing a predetermined relationship to glide slope angle.

It is a feature of this invention to create a modulated carrier frequency signal, the modulating phase bearing a predetermined relationship to glide slope angle by employing a driven radiating element coupled to a transmission line and a plurality of parasitic elements disposed for rotation about said central element in a vertical plane. In a preferred embodiment the parasitic elements are spaced at a radius approximately one-quarter wavelength of carrier frequency from said central element.

It is another feature of this invention to employ a horizontally disposed central radiating element coupled to a transmission line for radiating carrier frequency and a plurality of horizontally disposed parasitic elements arranged and supported for rotation about the horizontal axis of said central element, the plane of said rotation being vertical and the axis of said rotation being perpendicular to the direction of approach of aircraft.

Other features and objects of this invention will be more apparent from the following specific description taken in conjunction with the drawings, in which:

FIG. 4 depicts the direct radiation pattern and the ground reflected radiation pattern from an antenna having the group of 9 parasitic elements shown pictorially in FIG. 3;

FIG. 5 depicts the direct radiation pattern and ground reflected radiation pattern from an antenna having the single parasitic element shown in FIG. 3.

Figure 1:
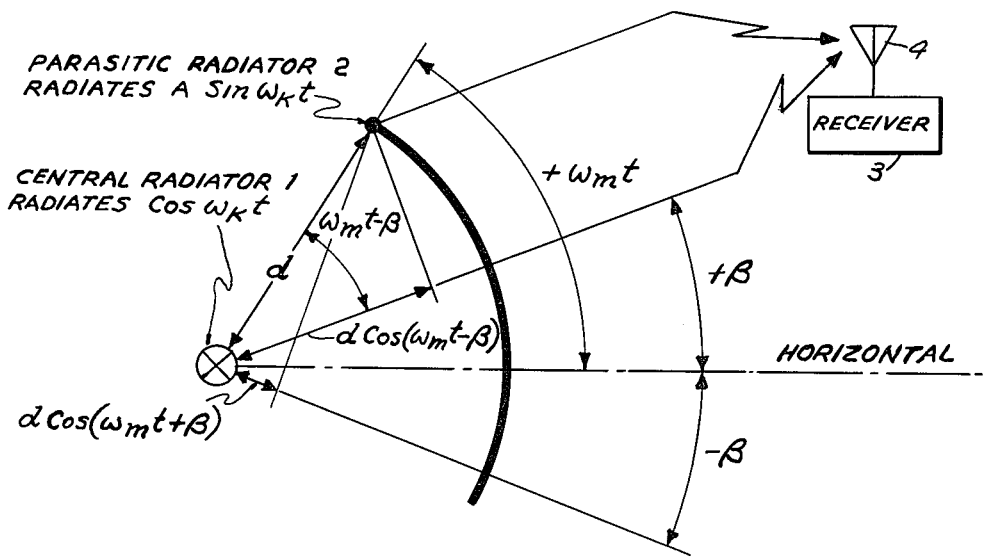
FIG. 1 is a diagram by which to understand the principles of this invention.

Turning first to FIG. 1, there is shown a diagram including a central radiator 1 energized to radiate a signal denoted cosine $\omega_K t$ and one of a number of equally spaced parasitic radiators 8, denoted 2, rotating about central radiator 1 on a radius $d$. The dimensions $d$ and the shape of parasitic radiator 2 are such that it radiates in quadrature with central radiator 1 emitting a signal denoted $$A \sin \omega_K t$$

where A denotes the amplitude ratio of parasitic radiation to central radiator radiation. Parasitic radiator 2 is rotated about central radiator 1 at an angular rate $\omega_m$ and on a radius $d$. The space repetition rate of lobes created by rotating parasites is $N\omega_m$, where N is the number of parasitic radiators.

Receiver 3 with receiving antenna 4 coupled thereto is preferably located a considerable distance from the radiators so that lines from radiators 1 and 2 to receiver antenna 4 may be considered parallel, each forming an angle $+\beta$ with the horizontal. Consequently, if the radiation received by receiver antenna 4 from the central radiator 1 is denoted $\cos \omega_K t$, then the radiation received from parasitic radiator 2 is denoted $$A \sin [\omega_K t + d \cos (\omega_m t - \beta)]$$

The combined radiation from radiators 1 and 2 received by receiver antenna 4 and denoted $E_{(+\beta)}$ is as follows:

(1) $E_{(+\beta)} = \cos \omega_K t + A \sin [\omega_K t + d \cos (\omega_m t - |\beta|)]$ If receiver antenna 4 were located below the horizontal at a position on elevation angle $-\beta$, the combined signal would be as follows:

(2) $E_{(-\beta)} = \cos \omega_K t + A \sin [\omega_K t + d \cos (\omega_m t + |\beta|)]$ Employing the trigonometric identity $$\sin(A + B) = \sin A \cos B + \cos A \sin \beta$$

in the right hand members of Equations 1 or 2 yields the following general expression for $E_{(\pm\beta)}$:

(3) $E_{(\pm\beta)} = \cos \omega_K t + A \cos [d \cos (\omega_m t \pm |\beta|)] \sin \omega_K t$
$+ A \sin [d \cos (\omega_m t \pm |\beta|)] \cos \omega_K t$ Substituting Bessel functions of the first kind for the terms cos $[d \cos (\omega_m t \mp |\beta|)]$ and sin $[d \cos (N\omega_m t \mp |\beta|)]$ in Equation 3 and rearranging terms yields the following:

$$E_{(\pm \beta)} = \cos \omega_K t \{1 + 2A[J_1(d) \cos (\omega_m t \mp |\beta|) \\ -J_3(d) \cos (3\omega_m t \mp 3|\beta|) + \\ J_5(d) \cos (5\omega_m t \mp 5|\beta|) \ldots \} \\ + 2A \sin \omega_K t \{[J_0(d)/2] - J_2(d) \cos (2\omega_m t \mp 2|\beta|) \\ + J_4(d) \cos (4\omega_m t \mp f|\beta|) - \\ J_6(d) \cos (6\omega_m t \mp 6|\beta|) \ldots \}$$

Figure 2A:
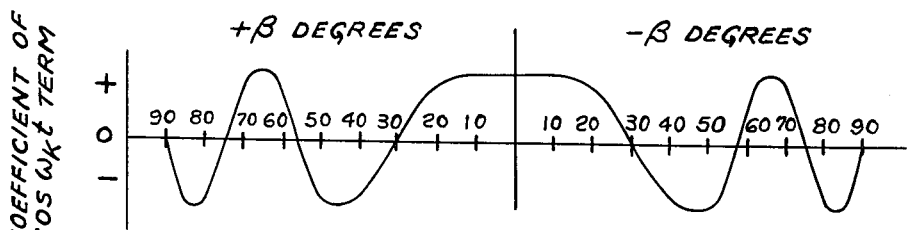
FIGS. 2a and 2b are plots of carrier signal coefficient versus glide slope angle.

A calculated pattern of the coefficients of cos $\omega_K t$, or the odd harmonic terms in Equation 4, is shown in FIG. 2a.

It can be proven that for a symmetrical array, the lowest harmonic that may occur in the pattern will correspond to the space repetition rate of the parasite system. Furthermore, the only higher harmonics to appear will be multiples of this space repetition rate. Consequently, if an odd number (greater than one) of equally spaced parasites are arranged around the central radiator, the only harmonics present will be integral multiples of said odd number. For example, if the odd number is N, the only harmonics of the space repetition rate $N\omega_m t$ will be $N\omega_m t$, $2N\omega_m t$, $3N\omega_m t$, etc.

When Bessel curves or tables are employed, it will be noted that when $N=9$ and when $d$ is chosen at which $J_9(d)$ is maximum, the values of $J_{2N}(d)$, $J_{3N}(d)$, $J_{4N}(d)$, etc., are so small that they may be neglected. The $J_0(d)$ term is not insignificant and must be retained. Removing all insignificant values, Equation 4 as a special case becomes:

(5) $E_{(\pm \beta)} = \cos \omega_K t [1 + 18 A J_9(d) \cos (9\omega_m t \mp 9|\beta|)] \\ + 18A \sin \omega_K t [J0 (d) /2]$ The sin $\omega_K t$ term in Equation 5 is constant and is not a function of $\beta$. Consequently its only effect is as a constant quadrature term producing a small phase shift in the carrier term that can be compensated for by slight adjustment of the radiation phase of the parasites.

Figure 2B:
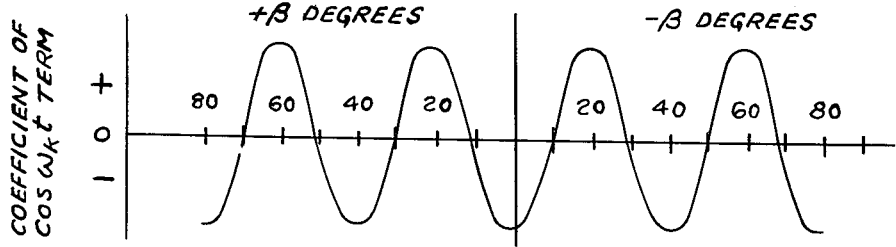

In FIG. 2b there is shown a calculated pattern of the coefficient of the cos $\omega_K t$ term in Equation 4. This calculated pattern is altered only slightly when calculated for Equation 5. It should be noted that the calculated pattern for nine parasites shown in FIG. 2b may be obtained by superimposing nine plots similar to FIG. 2a, each progressively shifted 40 degrees.

It is apparent from FIG. 2b that for the special case of nine parasites the modulation phase of the carrier signal varies with glide slope angle $\beta$ and that this variation is linear because the plot is a sinewave. It is also apparent that the modulation phase for the special case is the same at $+\beta$ as at $-\beta$ because the coefficient of the cos $\omega_K t$ term is the same at equal absolute values of $+\beta$ and $-\beta$.

Figure 3:
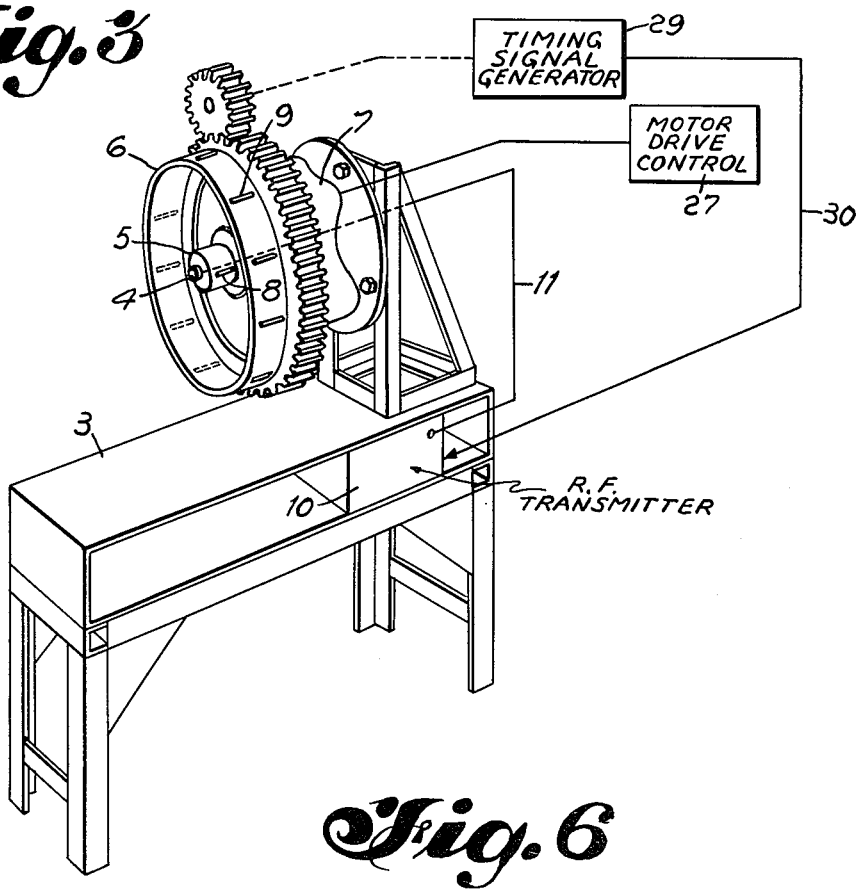
FIG. 3 is a pictorial view of an embodiment of this invention mounted on a stand.

Turning next to FIG. 3, there is shown a pictorial view of a glide slope beacon antenna incorporating various features of this invention mounted on a stand 3. The antenna consists of a horizontally disposed driven element 4 energized by carrier frequency and two nonconductive cylindrical support members 5 and 6 disposed coaxially with driven element 4 and rotated thereabout at a given speed by drive motor 7. Support member 5 is of considerably smaller diameter than support member 6. Numerous parasitic radiators are fixed to support members 5 and 6 and therefore rotate about driven element 4. These parasitic radiators are shown horizontally orientated on each support member. However, any suitable shape or orientation of said parasitic radiators on the support members may be employed. In the embodiment of FIG. 3 a single parasitic element 8 is fixed to the cylindrical support 5 and nine parasitic elements denoted 9 are equally spaced about cylinder 6.

In operation, cylinders 5 and 6 may be rotated by motor 7 at the same speed or at different speeds to produce a pattern of modulated carrier signal in which modulation phase is indicative of glide slope angle. In the embodiment shown in FIG. 3 there are two modulations imposed on the carrier signal, one, a fundamental modulation, is imposed by the rotating parasitic element 8 and the other, a harmonic modulation, is imposed by the nine rotating parasitic elements 9. If support cylinders 5 and 6 are rotated at the same speed, the harmonic modulation is the ninth harmonic of the fundamental modulation. Receiver equipment on board an aircraft is turned to the carrier signal, and both modulations are detected and phase compared with standard phase or timing signals. The fundamental modulation is compared with a fundamental standard and the harmonic modulation with a harmonic standard.

These standard signals may be obtained in any of a variety of manners. For example, the aircraft may carry a clock synchronized with the motor 7 and thereby producing the fundamental and harmonic standards or the standard signals may be transmitted from the ground to the aircraft from a transmitter synchronized with the motor 7.

For energizing the driven element 4, the stand 3 may be arranged to contain a source of RF energy, such as an RF transmitter 10, which is coupled by means 11 to the driven element 4. Since the driven element 4 does not have to rotate with the cylinders and is preferably stationary, the means 11 may take the form of a suitable cable. The RF energy from the source 10 may be a continuous wave or may be in the form of pulses of RF energy, the latter being preferred where power conservation has significance. The repetition rate of such pulses should be sufficient to define the envelope formed thereon by both the fundamental modulation produced by parasite 8 and the harmonics produced by the parasites 9 as the cylinders 5 and 6 are being rotated.

Turning next to FIG. 4, there is shown carrier frequency radiation with lobes produced by the nine parasitic radiators 9 of the real antenna shown in FIG. 3 and an image antenna at equal spacing below the ground. Direct radiation from the real antenna at a glide slope $+\beta$ is denoted as A and reflected radiation from the ground is denoted A.'

In FIG. 5 there is shown carrier frequency radiation with a single lobe such as is produced by the single parasitic radiating element 8 shown in FIG. 3. The purpose of single element 8 is to create such a single lobe superimposed on the radiation lobes produced by radiators 9, thereby improving radiation amplitude characteristics so as to remove nulls at certain glide slope angles.

If the real and image antennas shown in FIG. 4 are replaced by one equivalent antenna at ground level, the vertical characteristics of the equivalent antenna, denoted $E_{eg}$, is as follows:

(6) $E_{eg} = A'[2 \cos \omega_K t (\sin (h \sin \beta))]$

In Equation 6, A' is equal to the coefficient of the cos $\omega_K t$ term in Equation 5. By observation, it can be seen that $E_{eg}$ is zero when $\beta$ is zero, just as can be expected with horizontal antennas placed above ground.

In order to reduce the depth of the nulls in the amplitude of the vertical pattern, some dissymmetry must be established in the vertical pattern of the array so that the space factor of $+\beta$, denoted $S_{(+\beta)}$ is not equal to the space factor of $-\beta$, denoted $S_{(-\beta)}$. This dissymmetry may be achieved by adjusting one parasitic element to produce a vertical pattern of a cardioid. Consequently, upon rotation of the antenna, the amplitude of direct energy and reflected energy will vary with rotation angle. Such a dissymmetry and its effects are shown in FIG. 5.

As can be seen from FIG. 5, the total energy received from the real and image antennas is:

(7) $E_{eg} = A'\{\sin \omega_K t [S_{(\beta)} - S_{(-\beta)} \cos (2h \sin \beta)] + \cos \omega_K t [S_{(-\beta)} \sin (2h \sin \beta)]\}$ In Equation 7 $S_{(\beta)}$ represents the amplitude of the cardioid pattern at $+\beta$ and $S_{(-\beta)}$ represents its amplitude at −β. By observation, it can be seen that the carrier term $\sin \omega_K t$ has a quadrature term, $\cos \omega_K t$. However this quadrature term produces no modulation phase shift unless it becomes large with respect to the $\sin \omega_K t$ term. Ground reflectivity makes the amplitude of the $\cos \omega_K t$ term small relative to the amplitude of the $\sin \omega_K t$ term, consequently the $\cos \omega_K t$ term may be ignored yielding:

(8)  $E_{eg} = A' \sin \omega_K t [S_{(\beta)} - S_{(-\beta)} \cos (2h \sin \beta)]$ Obviously (9)  $S_{(-\beta)} \cos (2h \sin \beta) \ll S_{(\beta)}$ and consequently no amplitude nulls will appear as β goes from zero to ninety degrees.

Figure 6:
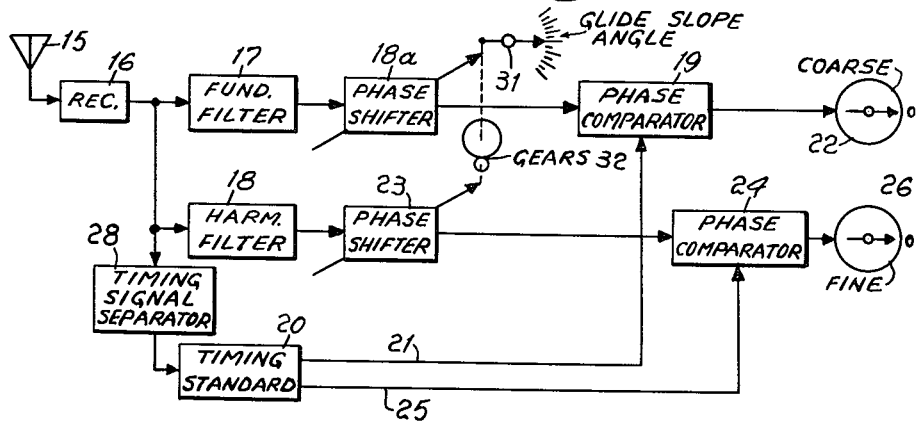
FIG. 6 is a block diagram of a receiving system for use with the glide slope system of FIG. 3.

Referring now to FIG. 6, a receiving system, adapted to be airborne, for use with a glide slope transmitter such as shown in FIG. 3, is there illustrated. The system includes an antenna 15 feeding an RF receiver 16. In the receiver 16, the modulation envelope formed by the rotation of the RF is separated and delivered as output. This output is a complex wave containing the fundamental component produced by the parasite 8 during its rotation, and a harmonic component produced by the rotation of the parasites 9. The fundamental component is separated in a filter 17; the harmonic component is separated in a filter 18. The fundamental component is fed through a phase shifter 18a to a phase comparator 19 where it is compared with a wave of the same frequency as said fundamental but of fixed phase. This wave may be derived from a timing standard 20 and applied over line 21 to the phase comparator 19. The output of the phase comparator is applied to an indicator 22.

In similar fashion, the output of harmonic filter 18 is fed through a phase shifter 23 to a phase comparator 24. In phase comparator 24, the phase of this phase shifted energy is compared with the phase of a wave of the same frequency but of fixed phase derived from timing standard 20 and fed over line 25 to said phase comparator. The output of phase comparator 24 is applied to another indicator 26.

The timing standard 20 may be a very stable oscillator or oscillators, whose phase and frequency are rigidly controlled so that they are synchronized with the rotation of cylinders 5 and 6 at the glide slope equipment of FIG. 3.

Various known ways of accomplishing this may be provided. For example, the timing standard 20 may be an accurate "atomic clock," which is originally preset and synchronized with the motor drive control 27, which drives the motor rotating the cylinders carrying the parasites (see FIG. 3). More simply, the timing standard 20 may be a synchronizable oscillator whose timing is controlled by synchronizing pulses transmitted from the glide slope equipment and separated at the output of receiver 16 by a timing signal separator 28 and applied to the timing standard 20.

The timing signals at the glide slope transmitter may be directly derived from the rotation of the shaft carrying cylinders 5 and 6 and producing a timing signal each time one of the parasites passes a given point. These timing signals are applied to the transmitter 10 and are emitted from the central radiator 4. They may consist of groups of pulses having a unique spacing or some other identifying characteristic enabling separation thereof from the fundamental and harmonic components at the receiver. Various techniques of this type are well known in the art. Referring for the moment to FIG. 3, the aforedescribed equipment is illustrated as consisting of timing signal generator 29 connected to the cylinders 5 and 6 and producing output timing signals controlled by the rotation of said cylinders, which signals are fed over line 30 to the transmitter 10.

Returning to FIG. 6 and the operation of the system there shown, the glide slope angle is selected by manually adjusting a glide slope angle selector knob 31 which shifts phase shifters 18a and 23 to the position thereby determined. A reduction gear 32 is provided between phase shifters 18 and 23. The gear 32 has a ratio equal to the ratio of the number of outer parasites 9 to the inner parasite 8. In the example shown, it would have a gear ratio of 9:1 since there are nine outer parasites and one inner parasitic element, and for each cycle of the fundamental component, there are nine cycles of the harmonic component. Stated another way, for each degree that phase shifter 18a is shifted by the selector 31, phase shifter 23 should be shifted nine degrees in the specific example described. It will be obvious that when the plane is on the right glide slope, which has been selected by selector 31, then the phase of the signals applied to phase comparator 19 will be the same and similarly the phase of the signals applied to phase comparator 24 will be the same and, thus, indicators 22 and 26 will give a zero or "on course" reading. If the plane is off the selected glide slope, the indicators will similarly deviate from the zero or "on course" reading. It will be recognized that indicator 22 will give a relatively coarse reading, while indicator 26 will give a fine reading since the indicator 26 is controlled by the harmonic which theoretically should give nine times the movement of indicator 26 for any deviation, as compared with indicator 22.

While there is described above a preferred glide slope receiver for use with the glide slope equipment of the present invention, it will also be apparent that other suitable receivers may be used therefor and that numerous variations may be made in the receiver utilizing the fundamental ideas described above.

While there is described herein specific embodiments of this invention employing common types of driven radiating elements and parasitic elements, numerous other types could be employed in the manner hereindescribed to produce wavefronts of direct and ground reflected signal, the modulation phase of said wavefronts being the same at a given glide slope angle. Consequently, other types of radiators with means for support and rotating parasitic elements could be employed without deviating from the spirit or scope of this invention as set forth in the accompanying claims.

We claim:
1. A glide slope aircraft instrument landing system comprising a beacon emitting electromagnetic radiation having phase characteristics which define glide slope paths, said beacon being adapted to utilize reflections of said radiation from the ground in reinforcing said phase characteristics, equipment carried by an aircraft to cooperate with said beacon, said equipment comprising receiving means responsive to said radiation from said beacon, phase shifting means coupled to the output of said receiver, selecting means coupled to said phase shifting means for selecting any desired glide slope path for said aircraft, a fixed phase reference signal of the same frequency of said receiver output, means to compare the output of said phase shifting means with said fixed phase reference signal, and indicating means coupled to said comparing means for determining the glide slope of said aircraft with respect to said desired selected glide slope path.

2. A glide slope aircraft instrument landing system comprising a beacon emitting electromagnetic radiation having phase characteristics which define a plurality of glide slope paths, said beacon comprising a horizontally disposed central radiator having a horizontal axis, a plurality of parasitic elements disposed about said central radiator at radii such that reradiation from said parasitic elements is in time quadrature with radiation from said central element, means for rotating said plurality of parasitic elements in a vertical plane about said horizontal axis whereby the radiation from said beacon defines phase characteristics which are indicative of the glide slope paths of aircraft utilizing said system, equipment carried by an aircraft to cooperate with said beacon and comprising receiving means responsive to said radiation from said beacon, phase shifting means coupled to the output of said receiver, selecting means coupled to said phase shifting means for selecting any desired glide slope path for said aircraft, a fixed phase reference signal of the same frequency of said receiver output, means to compare the output of phase shifting means with said fixed phase reference signal, and indicating means coupled to said comparing means for indicating the glide slope of each said aircraft with respect to said selected glide slope path.

References Cited in the file of this patent

UNITED STATES PATENTS

| | | |
|---|---|---|
| 2,257,320 | Williams | Sept. 30, 1941 |
| 2,748,385 | Rust et al. | May 29, 1956 |
| 2,753,556 | Pickles | July 3, 1956 |
| 2,815,507 | De Faymoreau | Dec. 3, 1957 |
| 2,836,820 | Pickles et al. | May 27, 1958 |
| 2,912,693 | Tucanera et al. | Nov. 10, 1959 |
| 2,938,205 | Mandel | May 24, 1960 |
| 3,004,256 | Parker | Oct. 10, 1961 |

OTHER REFERENCES

"Electrical Communication," published by ITT 343/106, vol. 33, No. 1, March 1956 (pp. 55 to 59 relied on).